United States Patent
Kellner et al.

(10) Patent No.: US 12,548,821 B2
(45) Date of Patent: Feb. 10, 2026

(54) HIGH VOLTAGE BATTERY COMPONENT AND METHOD OF ASSEMBLING A HIGH-VOLTAGE BATTERY COMPONENT

(71) Applicant: Dr. Ing. h.c. F. Porsche Aktiengesellschaft, Stuttgart (DE)

(72) Inventors: Philipp Kellner, Renningen (DE); Immanuel Vogel, Kornwestheim (DE); Dieter Schiebel, Korntal-Münchingen (DE); Sascha Mostofi, Zeltingen (DE); Adrian Starczewski, Korntal-Münchingen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 953 days.

(21) Appl. No.: 17/715,130

(22) Filed: Apr. 7, 2022

(65) Prior Publication Data
US 2022/0328904 A1    Oct. 13, 2022

(30) Foreign Application Priority Data
Apr. 8, 2021  (DE) .................. 10 2021 108 761.9

(51) Int. Cl.
| | |
|---|---|
| *H01M 10/6556* | (2014.01) |
| *H01M 10/613* | (2014.01) |
| *H01M 10/625* | (2014.01) |
| *H05K 7/20* | (2006.01) |

(52) U.S. Cl.
CPC ..... *H01M 10/6556* (2015.04); *H01M 10/613* (2015.04); *H01M 10/625* (2015.04); *H05K 7/20272* (2013.01); *H05K 7/2039* (2013.01); *H01M 2220/20* (2013.01)

(58) Field of Classification Search
None
See application file for complete search history.

(56) References Cited

FOREIGN PATENT DOCUMENTS

| EP | 2945217 A1 | 11/2015 |
|---|---|---|
| KR | 20190135917 | * 12/2019 |
| WO | 2020115253 A2 | 6/2020 |

OTHER PUBLICATIONS

KR20190135917A (Translation) (Year: 2019).*
Great Britain Search Report for Application No. GB2205220.3, dated Oct. 10, 2022, one page.

* cited by examiner

*Primary Examiner* — Jonathan G Leong
*Assistant Examiner* — Taeyoung Son
(74) *Attorney, Agent, or Firm* — Buchanan Ingersoll & Rooney PC

(57) ABSTRACT

A high-voltage battery component includes a connection device for connecting a coolant line for a coolant to a heat sink of a high-voltage battery. The connection device has a connection part, which is connectable to the heat sink, and a sealing element arranged at the end of the connection part for providing a seal between the connection part and the heat sink. The connection device includes a spreading part, which is movable relative to the connection part. The spreading part, by pushing into the connection part, can be transferred from an insertion position for inserting the connection part into the heat sink into a sealing position. In the sealing position, the spreading part spreads the sealing element radially outward such that the sealing element can be placed in a sealing manner against the heat sink when the connection part is plugged into the heat sink.

17 Claims, 2 Drawing Sheets

HIGH VOLTAGE BATTERY COMPONENT AND METHOD OF ASSEMBLING A HIGH-VOLTAGE BATTERY COMPONENT

CROSS-REFERENCE TO RELATED APPLICATION

This application claims priority to German Patent Application No. 10 2021 108 761.9, filed Apr. 8, 2021, the content of such application being incorporated by reference herein in its entirety

FIELD OF THE INVENTION

The present invention relates to a high-voltage battery component, in particular for an at least partially electrically driven vehicle, and to a method for installing such a high-voltage battery component.

SUMMARY OF THE INVENTION

High-voltage batteries in fully or partially electrically operated vehicles are generally cooled or temperature-controlled with liquid cooling. A battery-side cooling connection is generally provided on a heat sink of the battery, to which a coolant line can be connected in order to conduct the coolant, for example, to an external cooler and back again to the battery.

For cooling such batteries, it has proven advantageous to provide the battery modules, in which the battery cells are grouped, with module housings in the form of extrusion profiles. The extrusion profiles have integrated coolant channels which are provided by the chambers of the profiles. Such an extrusion profile therefore provides the housing and at the same time a heat sink. A secure enclosure and at the same time a reliable cooling effect are thereby achieved.

However, the connection of the coolant lines to such module housings has proven problematic. In the prior art, to this end, connection stubs or the like are fastened to the module housings, and the coolant lines are then mounted thereon in a sealed manner. However, this requires construction space and increases the weight and the outlay on installation.

Preferred developments of the invention are the subject matter of the dependent claims. Further advantages and of the present invention emerge from the general description and from the description of the exemplary embodiment.

The high-voltage battery component according to aspects of the invention is provided in particular for an at least partially electrically driven vehicle. The high-voltage battery component comprises at least one connection device for connecting at least one coolant line for a coolant to a heat sink of a high-voltage battery. The connection device comprises at least one connection part, which is connectable in terms of flow to the heat sink, and at least one sealing element arranged (axially) at the end of the connection part. The sealing element serves in particular for providing a seal between the connection part and the heat sink. The connection device comprises at least one spreading part, which is movable relative to the connection part. The spreading part, by pushing into the connection part, can be transferred from an insertion position, which serves for inserting the connection part into the heat sink, into a sealing position, which serves for sealing the connection part in relation to the heat sink. In the sealing position (i.e. when the spreading part has been or is transferred into the sealing position), the spreading part spreads the sealing element radially outward such that the sealing element can be placed in a sealing manner against the heat sink when the connection part is plugged (correctly) into the heat sink.

The high-voltage battery component according to aspects of the invention affords many advantages. A considerable advantage is afforded by the connection device with the sealing element which can be pressed against the heat sink by the movable spreading part. A secure and reliable sealing effect is thereby ensured. At the same time, the sealing element can be inserted into the heat sink particularly simply and without the risk of damage since it is only radially expanded when it is arranged correctly in the heat sink.

A particular advantage is also that, with the invention, a coolant line can be connected directly to a cooling channel of an extrusion profile. As a result, construction space and weight are significantly saved in relation to the previously used connection solutions. The installation complexity can thereby also be considerably simplified.

The invention even permits a reliable and secure sealing of the connection if the chambers of the extrusion profile and therefore the cooling channels have a non-circular cross section. In the prior art, non-circular sealing points are generally sealed with an axial seal. However, this cannot be used in the extrusion profiles because of the design. In the prior art, radial seals are sometimes also used for non-circular sealing points. However, such radial seals conventionally require an insertion slope. The insertion slope, however, can be produced only in a highly complicated manner in extrusion profiles and, because of the construction space, results in a higher wall thickness of the extrusion profile and thus in an overall greater weight and construction space.

The coolant line can preferably be mounted on the connection part. It is also possible and advantageous for the coolant line to be able to be mounted on the spreading part. The coolant line can be mounted radially on the connection part and/or on the spreading part. This is advantageous if an axial or end-side actuation of the spreading part is provided, for example, by pressing or pulling. However, the coolant line can also be mountable at an axial end of the connection part and/or of the spreading part that is in particular opposite an axial end with the sealing element.

In particular, the spreading part has at least one spreading part channel through which coolant can flow. In an advantageous refinement, the spreading part channel is connected in terms of flow to the coolant line indirectly via the connection part. It is also possible and advantageous for the spreading part channel to be connected in terms of flow directly to the coolant line. The spreading part channel then has, for example, a flange or a connection piece or the like, on which the coolant line can be mounted. The spreading part channel runs in particular in the axial direction through the spreading part. The spreading part is designed to be displaceable in particular in the axial direction (and therefore in particular in the longitudinal direction of the spreading part channel).

In an advantageous development, the connection part has at least one connection part channel through which coolant can flow. The connection part channel runs in particular in the axial direction (or in the longitudinal direction) through the connection part. In particular, the spreading part, at least in the sealing position, extends at least partially within the connection part channel. In particular, the connection part channel and the spreading part channel are arranged at least partially coaxially. In particular, the coolant line can be connected to the connection part such that the spreading part channel can be connected in terms of flow to the coolant line indirectly via the connection part. However, the coolant line can also be connectable to the spreading part.

At least one sealing unit is preferably arranged between the connection part and the spreading part. In particular, the sealing unit, at least in the sealing position, counteracts the escape of coolant between the connection part and the spreading part. In particular, the sealing unit is designed as a radial seal or at least comprises at least one such radial seal. For example, the sealing unit comprises at least one O ring. Such a sealing unit is particularly advantageous if the coolant line can be connected to the connection part and the spreading part is designed such that the flow can pass through it.

In particular, the sealing unit is arranged on an axial end side of the connection part. In particular, the sealing unit, in the sealing position, lies against the spreading part. In particular, the sealing unit, in the sealing position, lies against an inner side of an end-side wall of the spreading part which extends outside the spreading part channel and/or closes the latter on the end side.

In all refinements, it is particularly preferred for the connection part and the spreading part to be designed as separate components. The connection part and the spreading part are fastened to each other preferably by means of at least one captive securing means. The components can thus be handled as a common structural unit during installation of the battery.

It is advantageous and preferred for the connection device to comprise at least one (releasable) latching connection. In particular, the latching connection is suitable and designed to block an undesired transfer of the spreading part from the sealing position into the insertion position and/or from the insertion position into the sealing position. In particular, the connection device comprises at least one first latching connection for the sealing position and at least one second latching connection for the insertion position. Such a latching connection ensures that the spreading part is permanently and stably fixed in the respective position and, during installation, permits, for example, a haptic or acoustic monitoring as to whether the spreading part has been pushed correctly into the sealing position.

The latching connection comprises in particular at least two corresponding latching elements. In particular, in each case at least one latching element is arranged on the connection part and in each case at least one latching element is arranged on the spreading part. It is possible for the captive securing means to be provided by the latching connection. For example, during the installation of the connection device, the spreading part is latched to the connection part in the insertion position. The latching connection may also be referred to as a clip connection.

The high-voltage battery component can comprise at least (the) one heat sink. The heat sink comprises at least one cooling connection to which the connection device can be connected in terms of flow. In particular, the cooling connection is provided by an axial end of the cooling channel. The cooling connection here has an inner contour which corresponds to an outer contour of the connection part and/or of the sealing element and/or of the spreading part in such a manner that, in the insertion position, the sealing element can be inserted into the cooling connection at least partially in a contact-free manner and/or substantially without force. In particular, in the insertion position, the sealing element can be inserted with less force than in the sealing position.

The heat sink is preferably designed as a profile body with at least one integrated cooling channel, or comprises at least one such cooling channel. The heat sink is particularly preferably designed as an extrusion profile, or comprises at least one such extrusion profile.

The cooling channel provides the cooling connection at at least one axial end. It is possible for the cooling connection to correspond to an axially open cooling channel. In particular, the connection device can be connected in terms of flow to the cooling channel. In particular, the connection part and/or the spreading part and/or the sealing element have an outer contour corresponding to the cross section of the cooling channel.

It is possible and advantageous that the connection part and/or the spreading part can be latched to the heat sink. It is also possible that the connection part and/or the spreading part can be mounted on the heat sink by means of at least one releasable fastening means and, for example, by means of a screw or the like. It is also possible and advantageous that the connection part and/or the spreading part can be mounted in an integrally bonded manner on the heat sink, for example by means of an adhesive connection or another integrally bonded joining type.

The sealing element is preferably arranged on the connection part in such a manner that it at least partially axially extends the connection part. In particular, the sealing element is fastened to a first axial end of the connection part. In particular, the sealing element is fastened at least partially upstream of the first axial end of the connection part. It is possible that the sealing element at least partially protrudes beyond a first axial end of the connection part.

In an advantageous development, the spreading part protrudes from a second axial end of the connection part. In particular, the second axial end is opposite the first axial end. In particular, the spreading part is actuable from the second axial end in order to be pushed into the sealing position. In particular, the spreading part, in the sealing position and preferably only in the sealing position, protrudes from the first axial end of the connection part. In particular, the spreading part, in the sealing position, presses against the sealing element radially from the inside. This permits particularly simple insertion into the heat sink and a readily accessible actuation of the spreading part. In such a refinement, the coolant line can be mounted in particular radially on the connection part.

It is possible and advantageous that the connection part has at least one radially arranged connection opening for the coolant line. In particular, the spreading part has at least one radially arranged opening. In the sealing position, the opening of the spreading part has a greater overlap with the connection opening of the connection part than in the insertion position. This permits, for example, automatic closing of the coolant line as long as the spreading part is still in the insertion position. In particular, the connection part comprises at least one connection stub for the coolant line, which connection stub is arranged in particular in the region of the connection opening.

The sealing element is preferably elastic. In particular, the sealing element contracts into a non-preloaded position when the spreading part is in the insertion position. As a result, tilting or damage of the sealing element during the installation is reliably avoided. In particular, the sealing element has at least one sealing lip encircling it radially on the outside.

The method according to aspects of the invention serves for installing a high-voltage battery component and preferably a high-voltage battery component as has been previously described. The method here comprises at least the following method steps in this sequence or in another meaningful sequence: connecting and in particular latching the connection part to the spreading part such that the spreading part is in the insertion position; inserting the connection part into the heat sink; pushing the spreading part into the connection part such that the spreading part is in the sealing position and the sealing element is spread radially outward and lies in a sealing manner against the heat sink.

In particular, the spreading part and the connection part are latched to each other in the insertion position in a preassembly operation. In particular, pushing in of the spreading part causes the sealing element to be spread in such a manner that it is pressed in a sealing manner radially from the inside against an inner wall of the cooling channel of the heat sink and in particular of a profile body. In particular, by transferring the spreading part into the sealing position, a flow connection from the coolant line into the heat sink, which flow connection has previously been at least partially blocked by the spreading part, is opened up.

In particular, the connection device is suitable and designed to be connected directly to the cooling channel of the heat sink. In particular, the connection device is connectable to a cooling channel with a non-circular and/or circular cross section. The connection device is in particular also connectable to other connection devices of the heat sink. In particular, the connection device is connectable to a non-circular or else to a circular connection opening of the heat sink.

In particular, the heat sink comprises at least one cooling channel. In particular, the cooling channel emerges from the end side of the heat sink. In particular, the heat sink comprises a plurality of cooling channels. In particular, the cooling channels extend parallel to one another through the heat sink and at least partially emerge at the axial ends or from the end side of the heat sink. The cooling channels can be at least partially closed here on the end sides. The cooling channel has in particular a non-circular cross section. The cooling channel can also have a circular cross section.

In particular, the heat sink provides a battery module housing or is part of such a battery module housing. The heat sink may also be formed separately from a housing. According to aspects of the invention, a heat sink is understood as meaning in particular a body through which a coolant can flow for cooling a high-voltage battery. The heat sink can be designed as a cooling plate and/or as part of a battery housing.

In particular, the heat sink is designed as a profile body and preferably as an extrusion profile or comprises at least one such profile body. The heat sink has in particular the geometrical properties of an extrusion profile, but can also be produced by a production process other than extrusion, for example by continuous casting or the like. In particular, the heat sink is produced in an endless manufacturing process. The profile body has in particular chambers which each provide a cooling channel. The chambers have in particular a non-circular cross section. The profile body comprises in particular a plurality of (integrated) cooling channels running parallel to one another and in the axial direction (or longitudinal direction) of the profile body. Owing to their production, the cooling channels have in particular no undercuts. The profile body, in particular the profile body, is preferably tubular. The heat sink, in particular the profile body, may also be U-shaped or L-shaped or plate-like. The connection device can also be connectable to a differently shaped heat sink.

In particular, the connection part and/or the spreading part are/is connectable in terms of flow to the coolant line and to the heat sink such that a coolant can flow between the coolant line and the heat sink via the connection part and/or the spreading part. The connection part and/or the spreading part are designed to be flowed through by coolant. The coolant line is in particular connectable or connected to an (external) cooling circuit.

In particular, the sealing element can be spread radially by an axial movement of the spreading part. In particular, the sealing element is closed annularly. The sealing element has in particular a central recess. The spreading part is movable in particular (concentrically) into the central recess of the sealing element. When the spreading part is located in the recess, it spreads the sealing element radially. In particular, in the sealing position, the spreading part extends further into the recess of the sealing element than in the insertion position. In particular, the spreading part extends into the recess of the sealing element only in the sealing position. The connection part in particular does not extend radially within or radially outside the sealing element. In particular, the sealing element is fastened to the connection part. In particular, the sealing element is fastened to the first axial end of the connection part.

The spreading part extends in particular within the connection part. In particular, the connection part and the spreading part are arranged concentrically. In particular, at the second axial end of the connection part, the spreading part extends both radially outside the connection part and radially within the connection part. In particular, the spreading part at least partially closes the second axial end of the connection part. In particular, the sealing unit is arranged at least at the second axial end of the connection part.

BRIEF DESCRIPTION OF THE DRAWINGS

Further advantages and of the present invention emerge from the exemplary embodiments which will be explained below with reference to the attached figures.

In the figures.

DETAILED DESCRIPTION OF THE INVENTION

Figure 1:
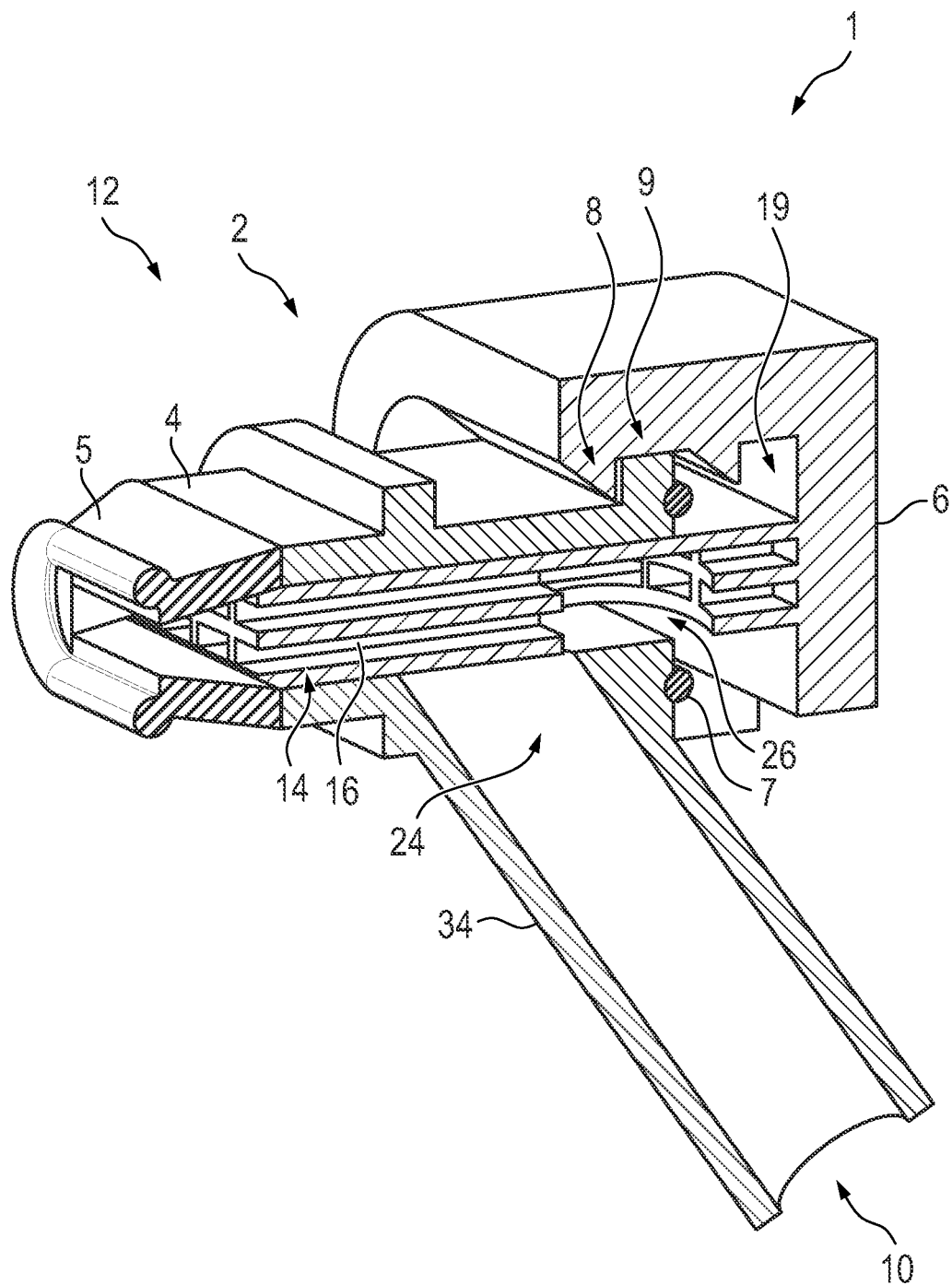
FIG. 1 shows a highly schematized illustration of a high-voltage battery component according to aspects of the invention in a sectioned perspective view.
Figure 2:
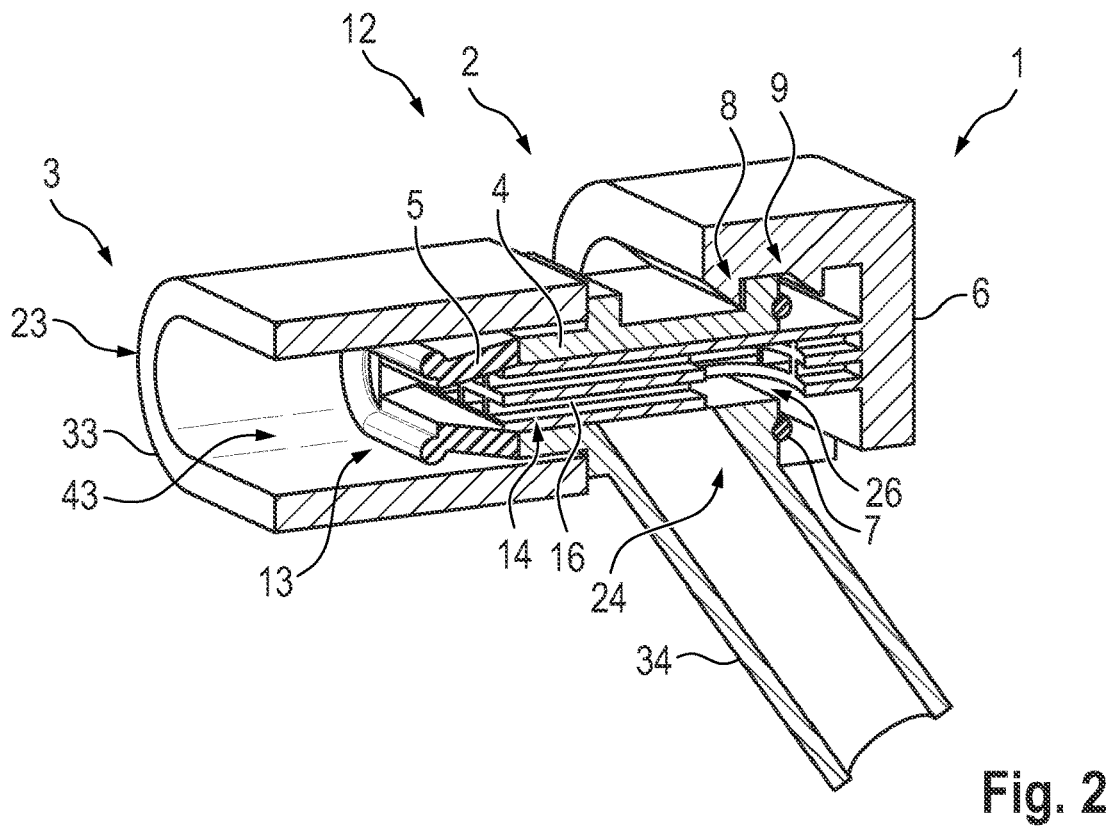
FIG. 2 shows the high-voltage battery component in an insertion position in a heat sink in a sectioned perspective view.
Figure 3:
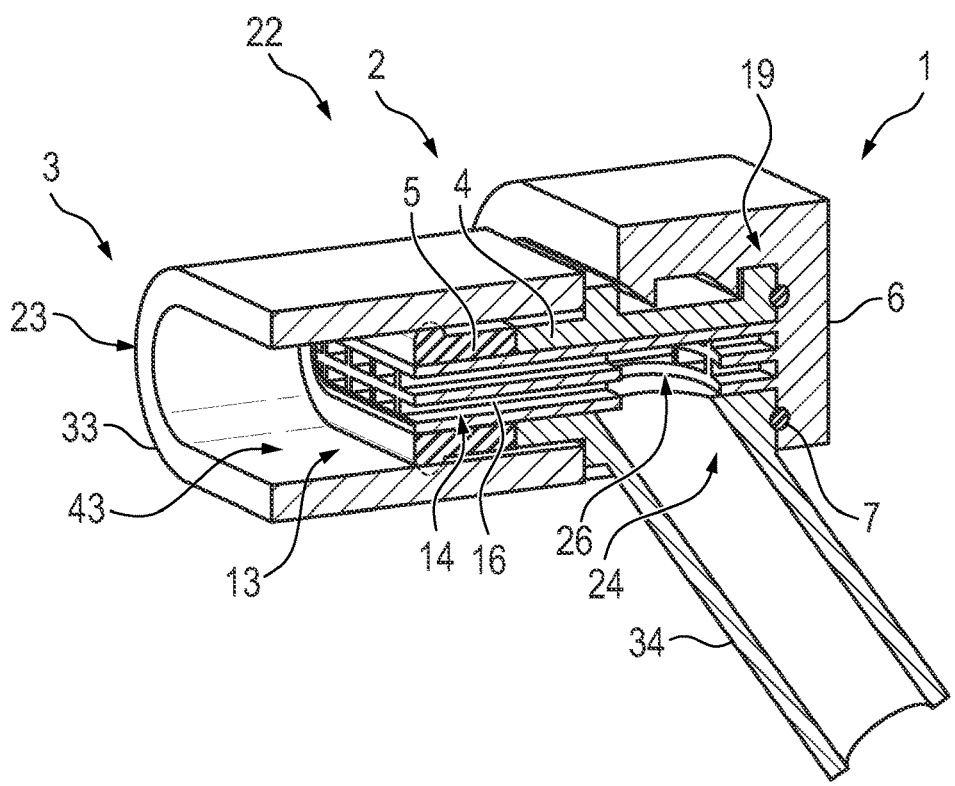
FIG. 3 shows the high-voltage battery component of FIG. 2 in a sealing position in the heat sink.

FIG. 1 shows a high-voltage battery component 1 according to aspects of the invention with a connection device 2 for connecting a coolant line 10, not illustrated here, to a heat sink 3, as is shown, for example, in FIGS. 2 and 3. As a result, the high-voltage battery, for example of an at least partially electrically driven vehicle, can be cooled with a coolant and, if required, also heated.

The connection device 2 comprises a connection part 4 which is connectable to the heat sink 3. The connection part 4 here has an axially running connection part channel 14 on which a connection opening 24 is arranged radially.

In addition, the connection part 4 here comprises a connection stub 34 for connecting the coolant line 10. The coolant can thus flow from the coolant line 10 through the connection opening 24 into the connection part channel 14 and emerge at an axially open end of the connection part channel 14.

A sealing element 5 which serves for providing a seal between the connection part 4 and the heat sink 3 is arranged at the end of the connection part 4. The sealing element 5 is arranged here at an axial end of the connection part 4 in such a manner that it extends the end thereof axially.

Furthermore, the connection device 2 comprises a spreading part 6 which is movable relative to the connection part 4. The spreading part 6 extends here within the connection part channel 14 and the coolant can likewise flow through it. For this purpose, the spreading part 6 here has a spreading part channel 16 which is open at an axial end such that the coolant can emerge in the region of the sealing element 5.

The spreading part 6 can be displaced between an insertion position 12 and a sealing position 22. The spreading part 6 is located here in an insertion position 12. By pushing the spreading part 6 into the connection part 4, said spreading part is transferred into a sealing position 22, as is shown in FIG. 3.

An opening 26 is arranged here radially on the spreading part channel 16, via which opening the coolant can enter the spreading part channel 16 when the coolant comes from the coolant line 10 and the spreading part 6 is in the sealing position 22.

The connection device 2 shown here can be used both to introduce the coolant into the heat sink 3 and also to discharge the coolant again from the heat sink 3. The flow paths described here can therefore be flowed through both in the one direction and in the other direction, as required.

The further components and functions and the method according to aspects of the invention for installing the high-voltage battery component 1 are presented in greater detail below with respect to FIGS. 1 to 3. FIGS. 1 and 2 show the insertion position 12 and FIG. 3 the sealing position 22.

In FIGS. 2 and 3, the connection device 2 is introduced into a heat sink 3, only part of which is shown here. The heat sink 3 is designed here as a profile body 23 and, for example, as an extrusion profile 33. The profile body 23 has a plurality of cooling channels 43, of which only one is shown here by way of example. The cooling channels 43 are provided by chambers running parallel to one another of the profile body 23.

The cooling channel 43 is open here at an axial end side of the profile body 23 such that a cooling connection 13 is provided for connecting to the connection device 2. The profile body 23 here has chambers with a non-circular cross section such that a non-circular inner contour is also produced for the cooling connection 13 and the cooling channel 43. For optimum sealing and a fitting seat in the cooling channel 43, the sealing element 5 and the connection part 4 are provided here with a corresponding non-circular outer contour.

The heat sink 3 here is also part of a module housing of a battery module, not illustrated specifically, of the high-voltage battery. A plurality of battery cells are grouped and enclosed in the module housing. The high-voltage battery comprises at least two and preferably a plurality of such heat sinks 3 designed as battery module housings.

For connection to the heat sink 3, the connection device 2 is in the insertion position 12, as is shown in FIGS. 1 and 2. In the insertion position 12, the spreading part 6 is positioned within the connection part 4 in such a manner that it only scarcely protrudes, if at all, at the axial end of the connection part 4 that is provided with the sealing element 5. As a result, the spreading part 6 does not have an effect on the sealing element 5. The sealing element 5 can therefore be inserted into the cooling channel 43 in a contact-free manner or at least with less force than in the sealing position 22.

After the connection device 2 has been arranged, as shown in FIG. 2, in the cooling channel 43, the spreading part 6 is then displaced into the sealing position 22. This installation state can be readily seen in FIG. 3. For this purpose, the connection part 4 lies here with a collar in a form-fitting manner against the end wall of the heat sink 3 such that it is prevented from being pushed in too deeply.

By pushing the spreading part 6 into the connection part 4, its axial end slides out of the connection part 4 and enters a central recess of the sealing element 5. As a result, the sealing element 5 is spread radially outward such that it is pressed in a sealing manner against the inner wall of the cooling channel 43.

As can readily be seen in FIG. 3, in the sealing position 22, the opening 26 at the spreading part channel 16 overlaps with the connection opening 24 of the connection part channel 14. As a result, in the sealing position 22, the flow path from the coolant line 10 into the heat sink 3 is opened up.

As can be seen in FIGS. 1 and 2, in the insertion position 12, the connection opening 24 of the connection part channel 14 is closed by the spreading part 6. The opening 26 of the spreading part channel 16 then does not overlap with the connection opening 24 of the connection part channel 14. The flow connection is thereby automatically closed during installation.

In order, during installation, to prevent the spreading part 6 from being inadvertently transferred from the insertion position 12 into the sealing position 22, a first latching connection 9 is provided here. For this purpose, in each case one or more latching elements are provided on the connection part 4 and on the spreading part 6, the latching elements blocking an unintentional displacement of the spreading part 6. The latching connection 9 can be overcome by targeted pressure on the rear axial end of the spreading part 6 such that the spreading part 6 can then be pushed into the connection part 4.

When the spreading part 6 is displaced into the sealing position 22, the first latching connection 9 is released and a second latching connection 19 latched in place. With the second latching connection 19, the connection device 2 is reliably locked in the sealing position 22.

The first latching connection 9 here at the same time provides a captive securing means 8 (e.g., clip, clamp, fastener and so forth) such that the connection part 4 and the spreading part 6 can be handled as a common component during installation.

In order to counteract an escape of the coolant between the spreading part 6 and the connection part 4, a sealing unit 7 is provided here. The sealing unit 7 is designed here as a radial seal and, for example, as an O ring. In the sealing position 22, the sealing unit 7 lies in a sealing manner between the connection part 4 and the spreading part 6.

The invention shown here permits a particularly simple and rapid, mass-produced installation of high-voltage batteries. A particular advantage of the invention is that a radial sealing effect is made possible without the use of an insertion slope. A reduction in the housing wall thicknesses is thereby possible. Overall, use of construction space, weight and costs are reduced.

| List of reference signs: | |
|---|---|
| 1 | High-voltage battery component |
| 2 | Connection device |
| 3 | Heat sink |
| 4 | Connection part |
| 5 | Sealing element |
| 6 | Spreading part |
| 7 | Sealing unit |
| 8 | Captive securing means |
| 9 | Latching connection |
| 10 | Coolant line |
| 12 | Insertion position |
| 13 | Cooling connection |
| 14 | Connection part channel |
| 16 | Spreading part channel |
| 19 | Latching connection |
| 22 | Sealing position |
| 23 | Profile body |
| 24 | Connection opening |
| 26 | Opening |
| 33 | Extrusion profile |
| 34 | Connection stub |
| 43 | Cooling channel |

What is claimed is:

1. A high-voltage battery component for an at least partially electrically driven vehicle, said high-voltage battery component comprising:
a connection device for connecting at least one coolant line to a heat sink of a high-voltage battery,
wherein the connection device includes:
(i) at least one connection part, which is connectable to the heat sink, wherein the connection part has at least one connection part channel through which coolant can flow,
(ii) at least one sealing element arranged at the end of the connection part for providing a seal between the connection part and the heat sink, and
(iii) at least one spreading part positioned at least partially within the connection part channel, the spreading part being which is-movable relative to the connection part between an insertion position and a sealing position, and
wherein, in the insertion position, the spreading part (a) does not spread the sealing element radially outward and (b) blocks coolant distributed by the coolant line from entering at least a portion of the connection part channel,
wherein, in the sealing position, the spreading part spreads the sealing element radially outward such that the sealing element is configured to be placed in a sealing manner against the heat sink when the connection part is plugged into the heat sink,
wherein, in the sealing position, the spreading part permits coolant distributed by the coolant line to enter the connection part channel for passage to the heat sink.

2. The high-voltage battery component as claimed in claim 1, wherein the coolant line is configured to be mounted on the connection part and/or on the spreading part.

3. The high-voltage battery component as claimed in claim 1, wherein the spreading part has at least one spreading part channel through which coolant can flow, and wherein the spreading part channel is fluidly connected to the coolant line either directly or indirectly via the connection part.

4. The high-voltage battery component as claimed in claim 3, and wherein the spreading part, at least in the sealing position, extends at least partially within the connection part channel, and wherein the coolant line is configured to be connected to the connection part such that the spreading part channel is fluidly connected to the coolant line indirectly via the connection part.

5. The high-voltage battery component as claimed in claim 1, further comprising at least one sealing unit arranged between the connection part and the spreading part, said sealing unit, at least in the sealing position, counteracting an escape of coolant between the connection part and the spreading part.

6. The high-voltage battery component as claimed in claim 1, wherein the connection part and the spreading part are separate components and are fastened to each other by at least one captive securing means.

7. The high-voltage battery component as claimed in claim 1, wherein the connection device further comprises at least one latching connection, and wherein the latching connection is configured to block a transfer of the spreading part from the sealing position into the insertion position and/or from the insertion position into the sealing position).

8. The high-voltage battery component as claimed in claim 1, further comprising the at least one heat sink with at least one cooling connection to which the connection device is configured to be fluidly connected, wherein the cooling connection has an inner contour which corresponds to an outer contour of the connection part and/or of the sealing element in such a manner that the sealing element is configured to be inserted in the insertion position at least partially in a contact-free manner and/or with less force than in the sealing position.

9. The high-voltage battery component as claimed in claim 8, wherein the heat sink is an extrusion profile body with at least one integrated cooling channel, and wherein the cooling channel provides the cooling connection at at least one axial end, and wherein the connection device is configured to be fluidly connected to the cooling channel.

10. The high-voltage battery component as claimed in claim 8, wherein the connection part and/or the spreading part is/are configured to be latched to the heat sink, and/or wherein the connection part and/or the spreading part are mounted on the heat sink by at least one releasable fastening means or in an integrally bonded manner with an adhesive connection.

11. The high-voltage battery component as claimed in claim 1, wherein the sealing element extends to a first axial end of the connection part, and wherein the spreading part protrudes from a second axial end of the connection part and is actuable from the second axial end in order to be pushed into the sealing position, and wherein, in the sealing position, the spreading part protrudes from the first axial end of the connection part and presses against the sealing element radially from the inside.

12. The high-voltage battery component as claimed in claim 1, wherein the connection part has at least one radially arranged connection opening for the coolant line, and wherein the spreading part has at least one radially arranged opening, and wherein, in the sealing position, the opening of the spreading part has a greater overlap with the connection opening of the connection part than in the insertion position.

13. The high-voltage battery component as claimed in claim 1, wherein the sealing element is elastic and contracts into a non-preloaded position when the spreading part is in the insertion position.

14. The high-voltage battery component as claimed in claim 1, wherein in the insertion position and the sealing position, the spreading part is positioned at least partially within the connection part channel.

15. The high-voltage battery component as claimed in claim 1, wherein the heat sink is positioned over the connection part and the spreading part is positioned within the connection part.

16. The high-voltage battery component as claimed in claim 1, wherein the connection part has at least one radially arranged connection opening for the coolant line, and wherein the spreading part has at least one radially arranged opening, and wherein, in the sealing position, the opening of the spreading part registers with the connection opening of the connection part to permit the passage of fluid from the connection part to the spreading part, and in the insertion position the opening of the spreading part does not register with the connection opening of the connection part thereby preventing the passage of fluid from the connection part to the spreading part.

17. The high-voltage battery component as claimed in claim 1, wherein the connection part is captivated to the spreading part.

\* \* \* \* \*